US011566584B1

(12) United States Patent
Gormley

(10) Patent No.: US 11,566,584 B1
(45) Date of Patent: Jan. 31, 2023

(54) THRUST REVERSER FOR VARIABLE AREA NOZZLE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/688,182

(22) Filed: Mar. 7, 2022

(51) Int. Cl.
*F02K 1/76* (2006.01)
*F02K 1/62* (2006.01)
*F02K 1/12* (2006.01)

(52) U.S. Cl.
CPC .............. *F02K 1/62* (2013.01); *F02K 1/123* (2013.01); *F02K 1/763* (2013.01); *F05D 2240/128* (2013.01); *F05D 2260/57* (2013.01)

(58) Field of Classification Search
CPC ........... F05D 2240/128; F05D 2250/12; F05D 2260/57; F02K 1/11; F02K 1/12; F02K 1/1207; F02K 1/60; F02K 1/605; F02K 1/62; F02K 1/625; F02K 1/763
See application file for complete search history.

(56) References Cited

U.S. PATENT DOCUMENTS

| 3,276,696 | A | 10/1966 | Brandt |
| 3,640,468 | A | 2/1972 | Searle |
| 4,375,276 | A | 3/1983 | Konarski |
| 4,894,985 | A * | 1/1990 | Dubois ..................... F02K 1/70 239/265.29 |
| 10,458,363 | B2 * | 10/2019 | Moradell-Casellas ..................... F02K 1/1261 |
| 2021/0403140 | A1 * | 12/2021 | Peterson ................... B64C 7/00 |

FOREIGN PATENT DOCUMENTS

GB          1141051 A       1/1969

* cited by examiner

*Primary Examiner* — Todd E Manahan
*Assistant Examiner* — Sean V Meiller
(74) *Attorney, Agent, or Firm* — Getz Balich LLC

(57) ABSTRACT

A variable area nozzle assembly for a gas turbine engine includes a fixed structure surrounding an exhaust duct extending along a nozzle centerline. The fixed structure further includes a first lateral side and a second lateral side opposite the first lateral side. The variable area nozzle assembly further includes a nozzle. The nozzle includes a nozzle outlet including a nozzle outlet cross-sectional area. The variable area nozzle assembly further includes a thrust reverser system including a first thrust reverser door and a second thrust reverser door. The first thrust reverser door is pivotably mounted to the fixed structure at the first lateral side. The second thrust reverser door is pivotably mounted to the fixed structure at the second lateral side. The first thrust reverser door and the second thrust reverser door define a portion of the nozzle outlet of the nozzle.

13 Claims, 9 Drawing Sheets

THRUST REVERSER FOR VARIABLE AREA NOZZLE

BACKGROUND

1. Technical Field

This disclosure relates generally to aircraft gas turbine engines, and more particularly to variable area nozzle assemblies for gas turbine engines.

2. Background Information

Turbojet engines for aircraft may frequently include variable area exhaust nozzles to accommodate subsonic, transonic, and supersonic speeds. Due to the different properties of exhaust gases as they flow through the nozzle at different speeds, there may be a need to vary the area of the nozzle at one or more locations within the nozzle in order to ensure proper and efficient turbojet operation over a range of aircraft flight conditions. What is needed are variable area nozzle assemblies which improve upon variable area nozzle assemblies conventionally known in the art.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for a gas turbine engine includes a fixed structure surrounding an exhaust duct extending along a nozzle centerline. The fixed structure defines an exhaust duct outlet of the exhaust duct. The fixed structure includes an upper side and a lower side opposite the upper side. The fixed structure further includes a first lateral side and a second lateral side opposite the first lateral side. The variable area nozzle assembly further includes a nozzle disposed about the nozzle centerline. The nozzle includes a nozzle outlet including a nozzle outlet cross-sectional area. The variable area nozzle assembly further includes a thrust reverser system including a first thrust reverser door and a second thrust reverser door. The first thrust reverser door is pivotably mounted to the fixed structure at the first lateral side about a first pivot axis. The second thrust reverser door is pivotably mounted to the fixed structure at the second lateral side about a second pivot axis. The first thrust reverser door and the second thrust reverser door define a portion of the nozzle outlet of the nozzle.

In any of the aspects or embodiments described above and herein, the nozzle outlet cross-sectional area may have a rectangular cross-sectional shape.

In any of the aspects or embodiments described above and herein, the nozzle may include an upper panel pivotably mounted to the fixed structure at the upper side and a lower panel pivotably mounted to the fixed structure at the lower side. Each of the upper panel and the lower panel may be pivotable between a first position defining a maximum area of the nozzle outlet cross-sectional area and a second position defining a minimum area of the nozzle outlet cross-sectional area.

In any of the aspects or embodiments described above and herein, each of the first thrust reverser door and the second thrust reverser door may extend from a first axial end located axially forward of the nozzle outlet to a second axial end located axially aft of the nozzle outlet.

In any of the aspects or embodiments described above and herein, the first pivot axis may be located axially between the first axial end and the second axial end of the first thrust reverser door and the second pivot axis may be located axially between the first axial end and the second axial end of the second thrust reverser door.

In any of the aspects or embodiments described above and herein, each of the first thrust reverser door and the second thrust reverser door may include an inner flowpath surface facing the nozzle centerline and an actuator cavity formed through the inner flowpath surface and the first axial end.

In any of the aspects or embodiments described above and herein, the thrust reverser system may further include a first actuator and a second actuator configured to pivot the first thrust reverser door and the second thrust reverser door, respectively. The first actuator may be mounted to the first thrust reverser door within the actuator cavity of the first thrust reverser door. The second actuator may be mounted to the second thrust reverser door within the actuator cavity of the second thrust reverser door.

In any of the aspects or embodiments described above and herein, each of the first thrust reverser door and the second thrust reverser door may include an actuator fairing pivotably mounted to a respective one of the first thrust reverser door and the second thrust reverser door. The actuator fairing may be pivotable between a stowed position and a deployed position. The actuator fairing, in the stowed position, may be configured to cover the actuator cavity.

In any of the aspects or embodiments described above and herein, the thrust reverser system may further include a first actuator and a second actuator. The first actuator may be mounted to the first thrust reverser door within the actuator cavity of the first thrust reverser door. The second actuator may be mounted to the second thrust reverser door within the actuator cavity of the second thrust reverser door.

In any of the aspects or embodiments described above and herein, each of the first actuator and the second actuator may include an actuator arm configured to contact the actuator fairing of the first thrust reverser door and the second thrust reverser door, respectively.

In any of the aspects or embodiments described above and herein, the actuator fairing may include a wear member including a ramped wear surface.

In any of the aspects or embodiments described above and herein, the actuator arm may be configured to slide along the ramped wear surface as the actuator fairing pivots between the stowed position and the deployed position.

In any of the aspects or embodiments described above and herein, the actuator fairing may be biased to the stowed position of the actuator fairing.

In any of the aspects or embodiments described above and herein, the second axial end of the first thrust reverser door may move toward the second axial end of the second thrust reverser door as the first thrust reverser door and the second thrust reverser door pivot from the stowed position to the deployed position.

According to another aspect of the present disclosure, a method for operating a thrust reverser system for a variable area nozzle assembly includes providing a fixed structure surrounding an exhaust duct extending along a nozzle centerline of the variable area nozzle assembly. The fixed structure includes a first lateral side and a second lateral side opposite the first lateral side. The method further includes operating the thrust reverser system by pivoting a first thrust reverser door mounted to the fixed structure at the first lateral side about a first pivot axis and pivoting a second thrust reverser door mounted to the fixed structure at the second lateral side about a second pivot axis.

In any of the aspects or embodiments described above and herein, the first pivot axis may be substantially parallel to the second pivot axis.

In any of the aspects or embodiments described above and herein, each of the first thrust reverser door and the second thrust reverser door may extend from a first axial end to a second axial end. The first pivot axis may be located axially between the first axial end and the second axial end of the first thrust reverser door. The second pivot axis may be located axially between the first axial end and the second axial end of the second thrust reverser door.

In any of the aspects or embodiments described above and herein, the method may further include providing a nozzle disposed about the nozzle centerline. The nozzle may include a nozzle outlet including a nozzle outlet cross-sectional area. The nozzle may further include an upper panel pivotably mounted to the fixed structure and a lower panel pivotably mounted to the fixed structure. Each of the upper panel and the lower panel may be pivotable between a first position defining a maximum area of the nozzle outlet cross-sectional area and a second position defining a minimum area of the nozzle outlet cross-sectional area.

In any of the aspects or embodiments described above and herein, the nozzle outlet cross-sectional area may have a rectangular cross-sectional shape.

According to another aspect of the present disclosure, a variable area nozzle assembly for a gas turbine engine includes a fixed structure surrounding an exhaust duct extending along a nozzle centerline. The fixed structure defines an exhaust duct outlet of the exhaust duct. The fixed structure includes an upper side and a lower side opposite the upper side. The fixed structure further includes a first lateral side and a second lateral side opposite the first lateral side. The variable area nozzle assembly further includes a nozzle disposed about the nozzle centerline. The nozzle includes a nozzle outlet including a nozzle outlet cross-sectional area. The nozzle further includes an upper panel pivotably mounted to the fixed structure and a lower panel pivotably mounted to the fixed structure. Each of the upper panel and the lower panel are pivotable between a first position defining a maximum area of the nozzle outlet cross-sectional area and a second position defining a minimum area of the nozzle outlet cross-sectional area. The variable area nozzle assembly further includes a thrust reverser system including a first thrust reverser door and a second thrust reverser door. The first thrust reverser door is pivotably mounted to the fixed structure at the first lateral side about a first pivot axis. The second thrust reverser door is pivotably mounted to the fixed structure at the second lateral side about a second pivot axis.

The present disclosure, and all its aspects, embodiments and advantages associated therewith will become more readily apparent in view of the detailed description provided below, including the accompanying drawings.

DETAILED DESCRIPTION

Figure 1:
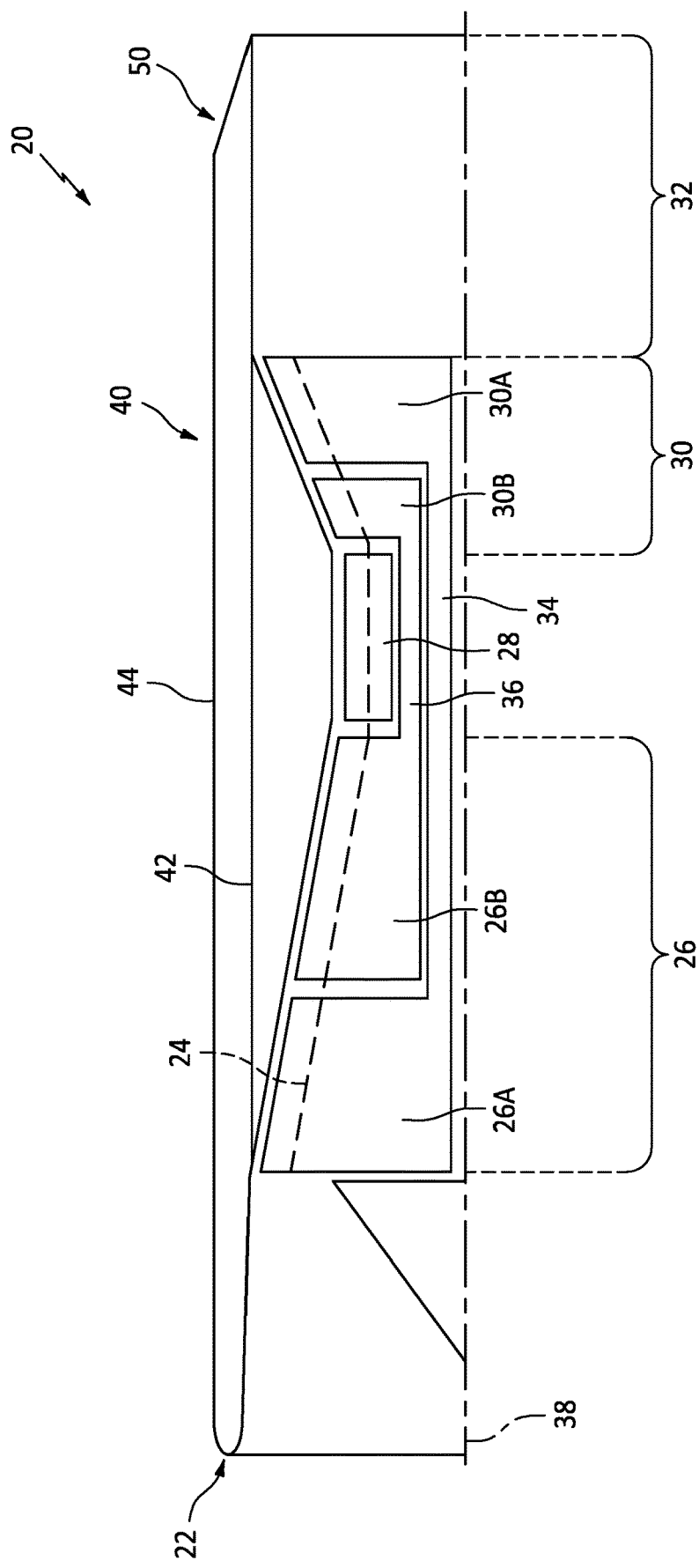
FIG. 1 illustrates a side cutaway view of a gas turbine engine, in accordance with one or more embodiments of the present disclosure.

Referring to FIG. 1, an exemplary gas turbine engine 20 capable of using aspects of the present disclosure is schematically illustrated. Although depicted as a turbojet gas turbine engine in the disclosed non-limiting embodiments, it should be understood that the concepts described herein are not limited to use with turbojets and may be applicable to other configurations of aircraft gas turbine engines as well including, but not limited to turboprop and turbofan gas turbine engines.

The gas turbine engine 20 generally includes an inlet structure 22 through which ambient air is directed into a core flow path 24 of the gas turbine engine 20. The air within the core flow path 24 may be referred to as "core air." The gas turbine engine 20 includes a compressor section 26, for compressing the core air, and a combustor 28 wherein the compressed core air is mixed with fuel and ignited for generating combustion gases. The gas turbine engine 20 further includes a turbine section 30 for extracting energy from the combustion gases. The resultant combustion gases from the combustor 28 are expanded through the turbine section 30 and then exhausted via an exhaust section 32, thereby providing thrust.

The compressor section 26 of the gas turbine engine 20 may include a low-pressure compressor 26A located upstream of a high-pressure compressor 26B. The turbine section 30 may include a high-pressure turbine 30B located upstream of a low-pressure turbine 30A. In one embodiment, the low-pressure compressor 26A may be connected to the low-pressure turbine 30A by a low-pressure shaft 34 and the high-pressure compressor 26B may be connected to the high-pressure turbine 30B by a high-pressure shaft 36. The compressors 26A, 26B, the combustor 28, and the turbines 30A, 30B may typically be concentric about a common axial centerline 38 (e.g., a rotational axis) of the gas turbine engine 20.

The compressor section 26, combustor 28, and turbine section 30 are arranged sequentially along the axial centerline 38 within an engine housing 40. This engine housing 40 includes an engine case 42 and a nacelle 44. The engine case 42 houses one or more of the compressor section 26, combustor 28, and turbine section 30, which may be collectively referred to as an "engine core." The nacelle 44 houses and provides an aerodynamic cover for the engine case 42. The engine housing 40 of FIG. 1 may also form the inlet structure 22 and at least a portion of a variable area nozzle assembly 46 for the exhaust section 32 of the gas turbine engine 20.

Referring to FIGS. 2-5, aspects of the present disclosure include a variable area nozzle assembly 46 for the exhaust section 32 (see FIG. 1). The variable area nozzle assembly 46 generally includes a fixed structure 48 of the gas turbine engine 20 which may be configured as or otherwise include, for example, the engine case 42, the nacelle 44, or another suitable fixed structure of the gas turbine engine 20. The fixed structure 48 surrounds an exhaust duct 50 generally extending along a nozzle centerline 52, which nozzle centerline 52 may or may not be colinear with the axial centerline 38 of the gas turbine engine 20 (see FIG. 1). The exhaust duct 50 is configured to direct exhaust gases along at least a portion of the core flow path 24 from the turbine section 30 to a variable area nozzle 54 mounted to the fixed structure 48 and located at a downstream end of the exhaust section 32. In some embodiments, the exhaust duct 50 may additionally be configured to direct gases from a bypass flowpath to the nozzle 54.

The fixed structure 48 defines an exhaust duct outlet 56 of the exhaust duct 50 at a downstream end of the exhaust duct 50. The fixed structure 48 includes an upper side 58 and a lower side 60 opposite the upper side 58. The fixed structure 48 further includes a first lateral side 62 and a second lateral side 64 opposite the first lateral side 62. Each of the first lateral side 62 and the second lateral side 64 extend between the upper side 58 and the lower side 60. The exhaust duct outlet 56 is defined between the upper side 58, the lower side 60, the first lateral side 62, and the second lateral side 64. It should be understood that relative positional terms, such as "forward," "aft," "upper," "lower," "above," "below," "upstream," downstream," "lateral," "vertical," and the like are relative to the normal operational attitude of the gas turbine engine 20 and should not be considered otherwise limiting.

Figure 3:
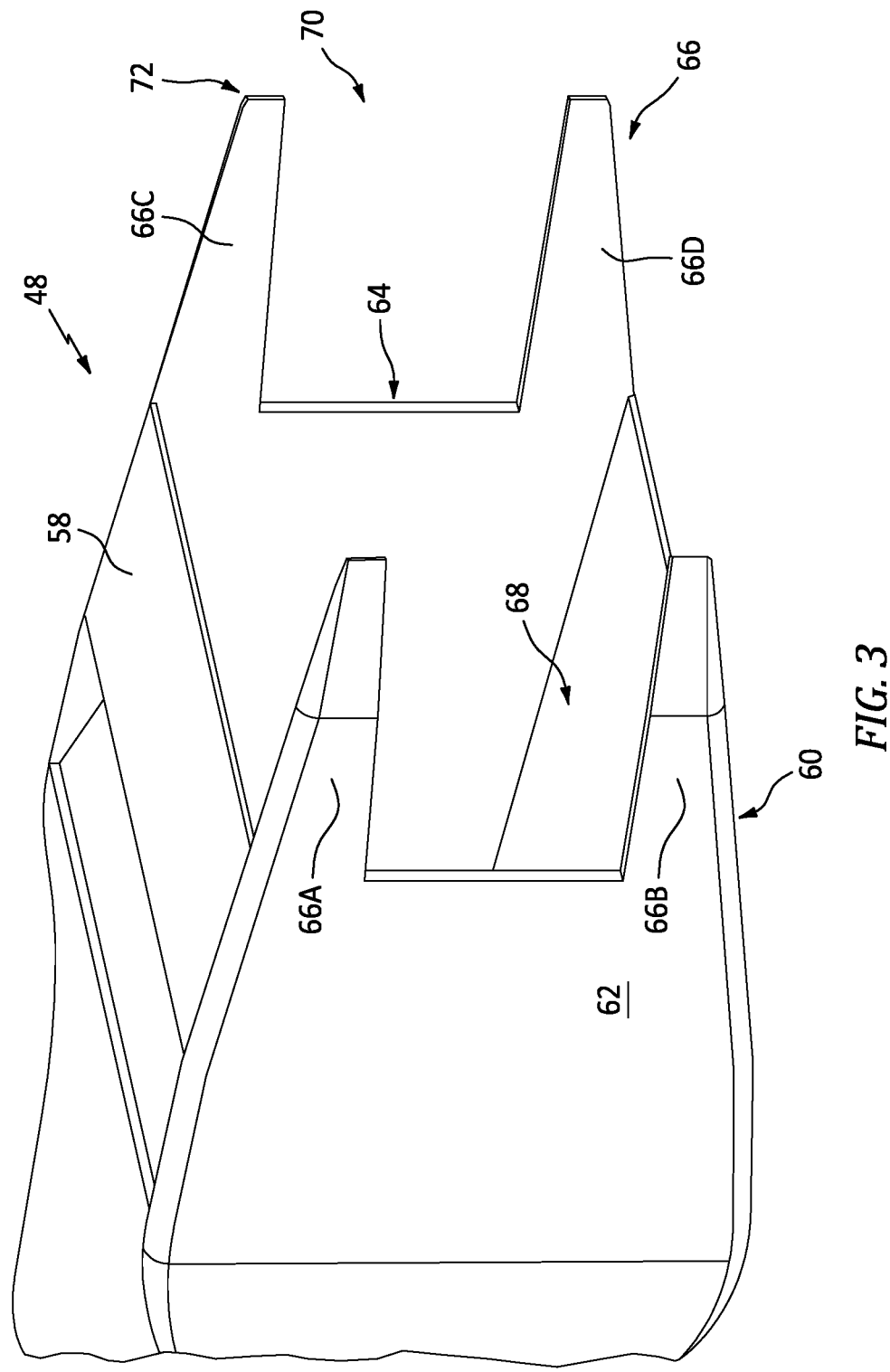
FIG. 3 illustrates a perspective view of a fixed structure for the variable area nozzle assembly of FIG. 2, in accordance with one or more embodiments of the present disclosure.

As shown in FIG. 3, the fixed structure 48 includes a plurality of arms 66 extending in an axially aftward direction from the exhaust duct outlet 56. The plurality of arms 66 may include a first upper arm 66A and a first lower arm 66B located on the first lateral side 62 of the fixed structure 48. The first upper arm 66A and the first lower arm 66B may define a first thrust reverser recess 68 therebetween. Similarly, the plurality of arms 66 may include a second upper arm 66C and a second lower arm 66D located on the second lateral side 64 of the fixed structure 48. The second upper arm 66C and the second lower arm 66D may define a second thrust reverser recess 70 therebetween. Each of the first thrust reverser recess 68 and the second thrust reverser recess 70 may extend axially from the exhaust duct outlet 56 to a distal end 72 of the fixed structure 48.

Figure 2:
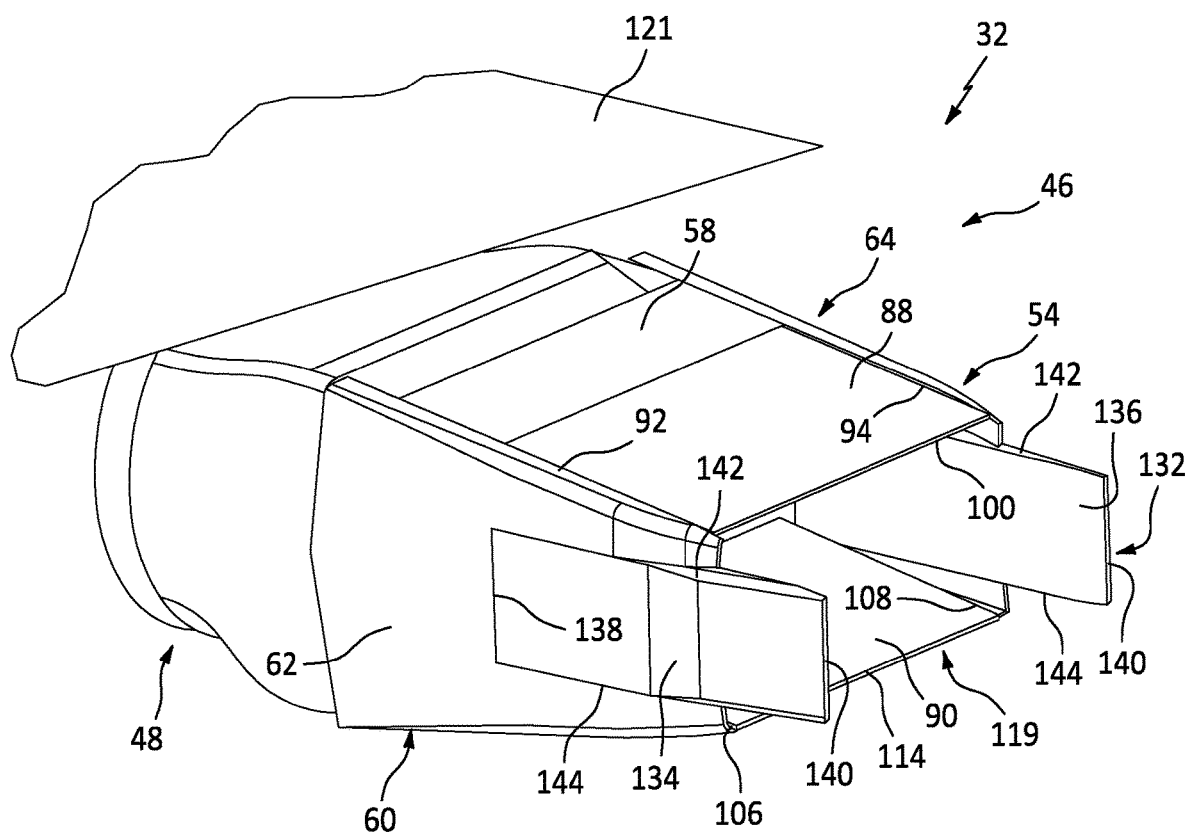
FIG. 2 illustrates a perspective view of a variable area nozzle assembly, in accordance with one or more embodiments of the present disclosure.
Figure 4:
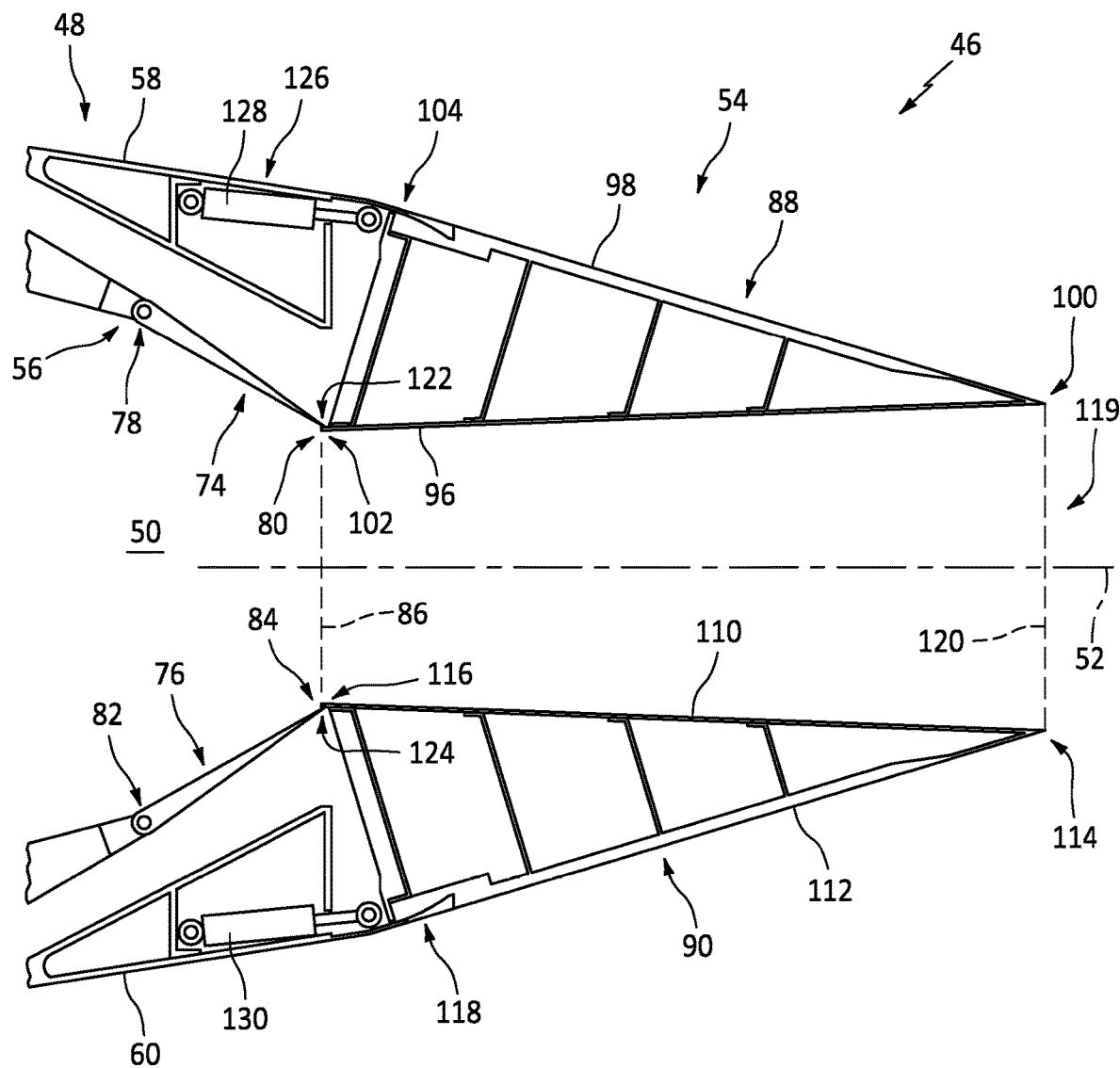
FIG. 4 illustrates a side sectional view of the variable area nozzle assembly of FIG. 2 including a nozzle in a first position, in accordance with one or more embodiments of the present disclosure.
Figure 5:
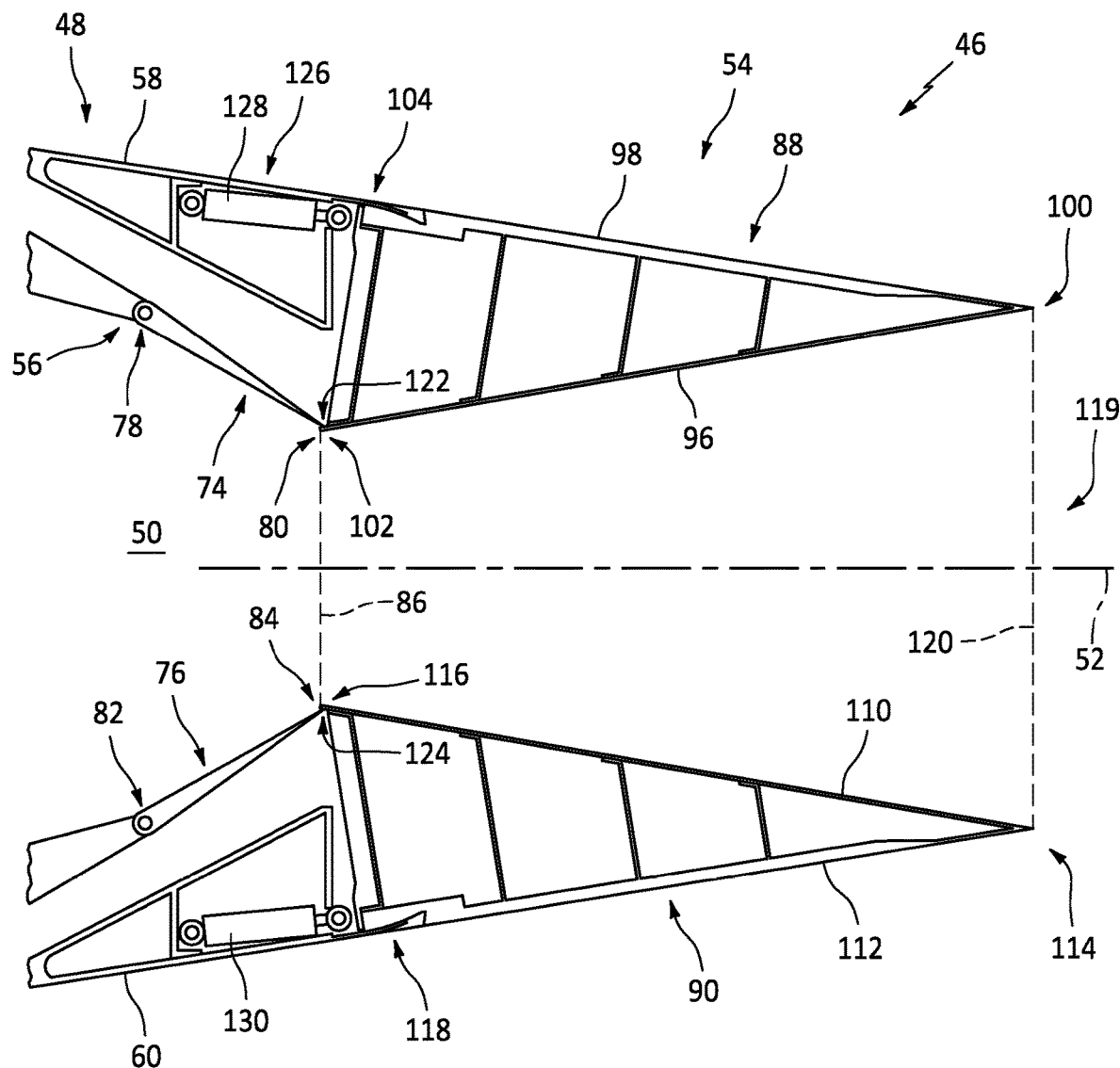
FIG. 5 illustrates a side sectional view of the variable area nozzle assembly of FIG. 2 including a nozzle in a second position, in accordance with one or more embodiments of the present disclosure.

Referring to FIGS. 2, 4, and 5, the nozzle 54 may include a series of movable panels configured to control a cross-sectional exhaust area of the nozzle 54 at one or more axial positions relative to the nozzle centerline 52. As shown, for example, in FIGS. 4 and 5, the nozzle 54 may be configured as a convergent-divergent nozzle. However, the present disclosure is not limited to this particular nozzle configuration and aspects of the present disclosure may be applicable to other configurations of variable area nozzles as well. The nozzle 54 of FIGS. 4 and 5 includes an upstream A8 axial portion which may be a converging portion of the nozzle 54. The nozzle 54 of FIGS. 4 and 5 further includes a downstream A9 axial portion which may be a diverging portion of the nozzle 54.

The nozzle 54 includes an upper A8 panel 74 and a lower A8 panel 76 which define the upstream A8 axial portion therebetween. The upper A8 panel 74 includes an upstream end 78 and a downstream end 80 opposite the upstream end 78. Similarly, the lower A8 panel 76 includes an upstream end 82 and a downstream end 84 opposite the upstream end 82. The downstream end 80 of the upper A8 panel 74 and the downstream end 84 of the lower A8 panel 76 define a throat cross-sectional area 86 of the nozzle 54 therebetween. In some embodiments, the upper A8 panel 74 may be pivotably mounted to the fixed structure 48 at the upstream end 78 and the lower A8 panel 76 may be pivotably mounted to the fixed structure 48 at the upstream end 82. The upper A8 panel 74 and the lower A8 panel 76 may be configured to pivot relative to the fixed structure 48 to vary a cross-sectional area of the throat cross-sectional area 86. In some other embodiments, the upper A8 panel 74 and the lower A8 panel 76 may be fixedly mounted to the fixed structure 48 or may be otherwise formed by the fixed structure 48 such that the throat cross-sectional area 86 is a substantially fixed cross-sectional area.

The nozzle 54 includes an upper A9 panel 88 and a lower A9 panel 90. The upper A9 panel 88 extends between a first lateral end 92 and a second lateral end 94 opposite the first lateral end 92. The upper A9 panel 88 includes an inner side 96 facing the nozzle centerline 52 and an outer side 98 opposite the inner side 96. The inner side 96 and the outer side 98 extend between the first lateral end 92 and the second lateral end 94. The inner side 96 and the outer side 98 meet at a downstream end 100 of the upper A9 panel 88. The inner side 96 extends from the downstream end 100 to an upstream end 102 and the outer side 98 extends from the downstream end 100 to an upstream end 104. The lower A9 panel 90 extends between a first lateral end 106 and a second lateral end 108 opposite the first lateral end 106. The lower A9 panel 90 includes an inner side 110 facing the nozzle centerline 52 and an outer side 112 opposite the inner side 110. The inner side 110 and the outer side 112 extend between the first lateral end 106 and the second lateral end 108. The inner side 110 and the outer side 112 meet at a downstream end 114 of the lower A9 panel 90. The inner side 110 extends from the downstream end 114 to an upstream end 116 and the outer side 112 extends from the downstream end 100 to an upstream end 118.

The downstream end 100 of the upper A9 panel 88 and the downstream end 114 of the lower A9 panel 90 define a nozzle outlet 119 having an outlet cross-sectional area 120 of the nozzle 54 therebetween. The upstream end 102 of the upper A9 panel 88 may be pivotably mounted to the downstream end 80 of the upper A8 panel 74 at a hinge line 122. The upstream end 116 of the lower A9 panel 90 may be pivotably mounted to the downstream end 84 of the lower A8 panel 76 at a hinge line 124. The upper A9 panel 88 and the lower A9 panel 90 may be configured to pivot relative to the upper A8 panel 74 and the lower A8 panel 76, respectively, to vary a cross-sectional area of the outlet cross-sectional area 120. The outer side 98 of the upper A9 panel 88 may be configured for sliding engagement with the fixed structure 48 at the upstream end 104. Similarly, the outer side 112 of the lower A9 panel 90 may be configured for sliding engagement with the fixed structure 48 at the upstream end 118.

As shown in FIG. 4, for example, the upper A9 panel 88 and the lower A9 panel 90 may be positioned in a radially innermost position to define a minimum area of the outlet cross-sectional area 120 (e.g., a minimum A9 position). As shown in FIG. 5, for example, the upper A9 panel 88 and the lower A9 panel 90 may be positioned in a radially outermost position to define a maximum area of the outlet cross-sectional area 120 (e.g., a maximum A9 position). Accordingly, the upper A9 panel 88 and the lower A9 panel 90 may be configured to pivot between the minimum A9 position, the maximum A9 position, and a plurality of intermediate A9 positions, relative to the upper A8 panel 74 and the lower A8 panel 76, respectively, to vary a cross-sectional area of the outlet cross-sectional area 120, as necessary for operation of the gas turbine engine 20. The outlet cross-sectional area 120, as well as other portions of the nozzle 54 (e.g., the exhaust duct outlet 56, the throat cross-sectional area 86, etc.), may have a rectangular or substantially rectangular cross-sectional shape (e.g., the outlet cross-sectional area 120 may be bounded, at least in part, by two substantially parallel lateral sides and two substantially parallel vertical sides). However, the present disclosure is not limited in application to only nozzles having rectangular or substantially rectangular cross-sectional shapes. As used herein, the term "substantially" with respect to a direction or angle refers to the stated direction or angle +/−five degrees.

Referring to FIGS. 4 and 5, the variable area nozzle assembly may include a nozzle actuation system 126 configured to effect pivoting of the upper A9 panel 88 and the lower A9 panel 90. The nozzle actuation system 126 may include at least one upper actuator 128 and at least one lower actuator 130. The upper actuator 128 and the lower actuator 130 may be located within the fixed structure 48 axially forward of the upper A9 panel 88 and the lower A9 panel 90. The upper actuator 128 may include a first end mounted to the fixed structure 48 and a second end mounted to the upper A9 panel 88 (e.g., proximate the outer side 98). The upper actuator 128 may be configured to actuate (e.g., to linearly expand or contract) to control a position of the upper A9 panel 88. Similarly, the lower actuator 130 may include a first end mounted to the fixed structure 48 and a second end mounted to the lower A9 panel 90 (e.g., proximate the outer side 112). The lower actuator 130 may be configured to actuate (e.g., to linearly expand or contract) to control a position of the lower A9 panel 90. The upper actuator 128 and the lower actuator 130 may be configured as pneumatic actuators, hydraulic actuators, electrical-mechanical actuators, or the like, and the present disclosure is not limited to any particular configuration of the upper actuator 128 and the lower actuator 130.

Figure 6:
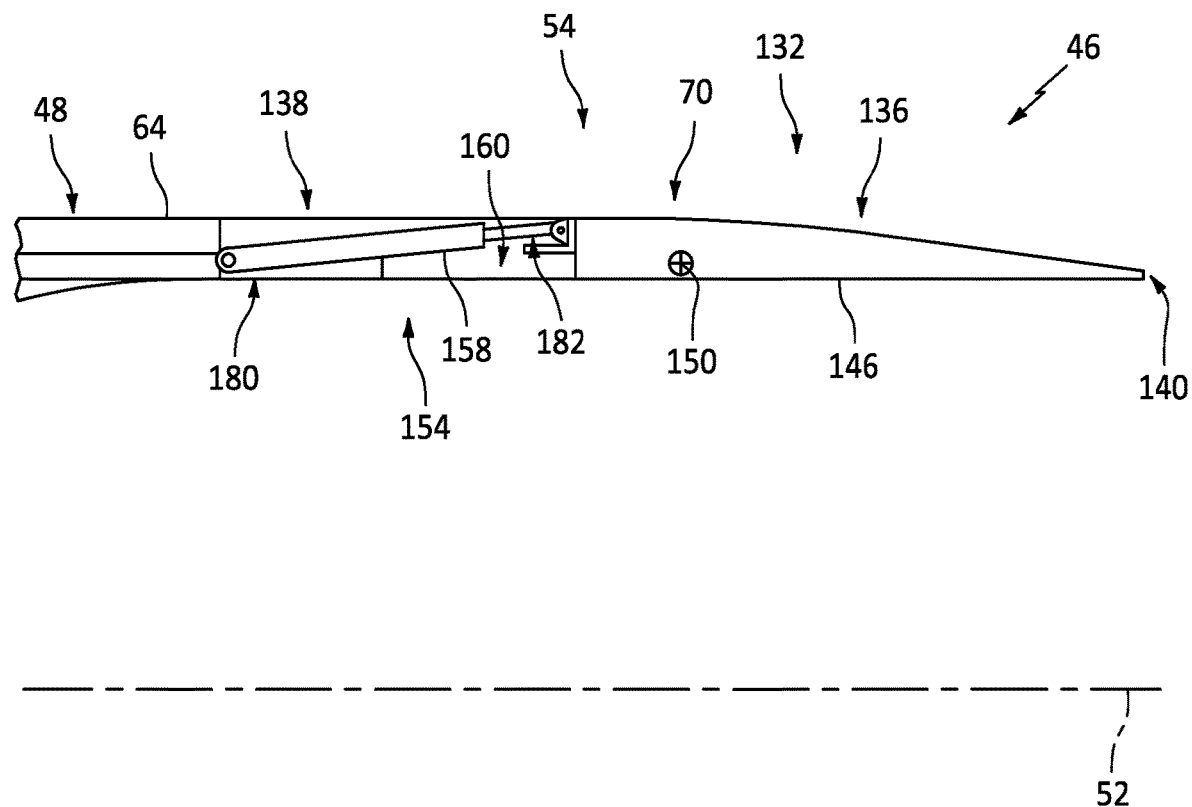
FIG. 6 illustrates a top sectional view of the variable area nozzle assembly of FIG. 2 including thrust reverser doors in a first position, in accordance with one or more embodiments of the present disclosure.
Figure 6:
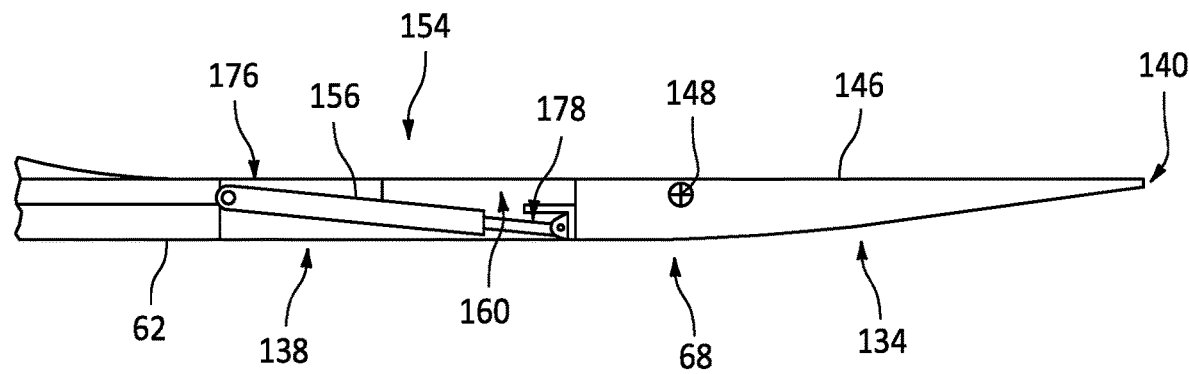
Figure 7:
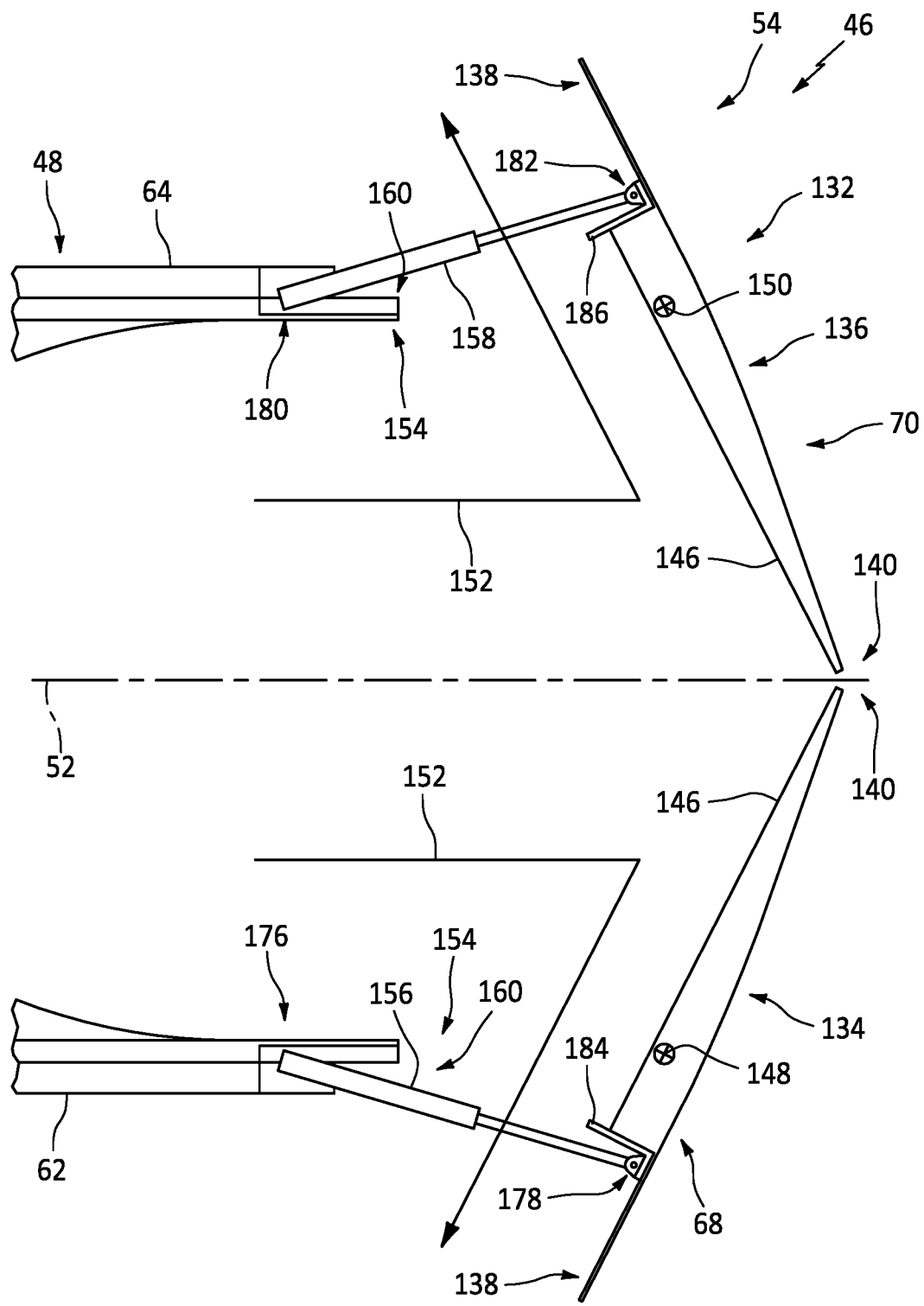
FIG. 7 illustrates a top sectional view of the variable area nozzle assembly of FIG. 2 including thrust reverser doors in a second position, in accordance with one or more embodiments of the present disclosure.

Referring to FIGS. 2, 6, and 7, the variable area nozzle assembly 46 includes a thrust reverser system 132. The thrust reverser system 132 includes a first thrust reverser door 134 and a second thrust reverser door 136. Each of the first thrust reverser door 134 and the second thrust reverser door 136 includes a first axial end 138 and a second axial end 140 opposite the first axial end 138. Each of the first thrust reverser door 134 and the second thrust reverser door 136 includes an upper side 142 and a lower side 144 opposite the upper side 142. Each of the first thrust reverser door 134 and the second thrust reverser door 136 includes an interior surface 146, located between the first axial end 138, the second axial end 140, the upper side 142, and the lower side 144, which faces the nozzle centerline 52. The interior surface 146 for each of the first thrust reverser door 134 and the second thrust reverser door 136 defines an inner flowpath surface for the exhaust gases passing through the nozzle 54.

As shown in FIG. 2, the first axial end 138 of each thrust reverser door 134, 136 may be located axially forward of the nozzle outlet 119 and the second axial end 140 of each thrust reverser door 134, 136 may be located axially aft of the nozzle outlet 119.

The first thrust reverser door 134 is pivotably mounted to the fixed structure 48 along the first lateral side 62 of the fixed structure 48. The first thrust reverser door 134 is positioned within the first thrust reverser recess 68. The first thrust reverser door 134 is pivotably mounted to the first upper arm 66A and the first lower arm 66B at a first pivot axis 148. The first thrust reverser door 134 is configured to pivot about the first pivot axis 148 with respect to the fixed structure 48. The first pivot axis 148 is located axially between the first axial end 138 and the second axial end 140 of the first thrust reverser door 134. The second thrust reverser door 136 is pivotably mounted to the fixed structure 48 along the second lateral side 64 of the fixed structure 48. The second thrust reverser door 136 is positioned within the second thrust reverser recess 70. The second thrust reverser door 136 is pivotably mounted to the second upper arm 66C and the second lower arm 66D at a second pivot axis 150. The second thrust reverser door 136 is configured to pivot about the second pivot axis 150 with respect to the fixed structure 48. The second pivot axis 150 is located axially between the first axial end 138 and the second axial end 140 of the second thrust reverser door 136. The first pivot axis 148 and the second pivot axis 150 may be substantially parallel to one another. In some embodiments, the thrust reverser system 132 may include thrust reverser door locks (not shown) configured to prevent inadvertent deployment of the thrust reverser doors 134, 136. The thrust reverser door locks may be mounted to the fixed structure 48 and may be configured to selectively engage and retain the thrust reverser doors 134, 136, for example, at or proximate the first axial end 138 of each of the thrust reverser doors 134, 136.

As shown in FIG. 2, the first thrust reverser door 134 and the second thrust reverser door 136 may define at least a portion of the nozzle outlet 119 of the nozzle 54, in addition to the upper A9 panel 88 and the lower A9 panel 90. The lateral positioning of the first thrust reverser door 134 and the second thrust reverser door 136 in the variable area nozzle assembly 46 may allow the nozzle outlet 119 of the nozzle 54 to be positioned closer to an aircraft body structure (e.g., an aircraft body structure 121 such as a wing or fuselage of an aircraft). In other words, a gas turbine engine including the variable area nozzle assembly 46 may have a more forward position relative to the aircraft body structure 121, thereby allowing the weight of the gas turbine engine shifted forward relative to an associated aircraft.

The first thrust reverser door 134 and the second thrust reverser door 136 are pivotable about the first pivot axis 148 and the second pivot axis 150, respectively, between a stowed position (see FIG. 6) and a deployed position (see FIG. 7). In the stowed position, the first thrust reverser door 134 and the second thrust reverser door 136 extend aftward from the fixed structure 48 in a generally axial direction. As the first thrust reverser door 134 and the second thrust reverser door 136 pivot from the stowed position to the deployed position, the first axial end 138 of each of the thrust reverser doors 134, 136 moves radially outward with respect to the nozzle centerline 52 while the second axial end 140 of each of the thrust reverser doors 134, 136 moves radially inward with respect to the nozzle centerline 52. In the deployed position, the second axial end 140 of the first thrust reverser door 134 may be positioned in contact with or proximate the second axial end 140 of the second thrust reverser door 136. In some embodiments, in the deployed position, the first axial end 138 of each of the thrust reverser doors 134, 136 may be located axially forward of the second axial end 140 of each respective one of the thrust reverser doors 134, 136. In the deployed position, the thrust reverser doors 134, 136 may obstruct exhaust gases (illustrated schematically as exhaust gases 152 in FIG. 7) exiting the nozzle 54 and may direct at least a portion of the exhaust gases out of the nozzle 54 through the first thrust reverser recess 68 and the second thrust reverser recess 70. Exhaust gases 152 exiting the nozzle 54 through the first thrust reverser recess 68 and the second thrust reverser recess 70 may exit in a direction having a forward axial component, as shown in FIG. 7.

Referring to FIGS. 6-9, the thrust reverser system 132 may include a thrust reverser actuation system 154 configured to effect pivoting of the first thrust reverser door 134 and the second thrust reverser door 136 about the first pivot axis 148 and the second pivot axis 150, respectively. The thrust reverser actuation system 154 may include at least one first actuator 156 and at least one second actuator 158. The first actuator 156 may include a first end 176 pivotably mounted to the fixed structure 48 and a second end 178 pivotably mounted to the first thrust reverser door 134. The first actuator 156 may be configured to actuate (e.g., to linearly expand or contract) to control a position of the first thrust reverser door 134. The first actuator 156 may include a first actuator arm 184 which extends from the first actuator 156 proximate the second end 178. Similarly, the second actuator 158 may include a first end 180 pivotably mounted to the fixed structure 48 and a second end 182 pivotably mounted to the second thrust reverser door 136. The second actuator 158 may be configured to actuate (e.g., to linearly expand or contract) to control a position of the second thrust reverser door 136. The second actuator 158 may include a second actuator arm 186 which extends from the second actuator 158 proximate the second end 182. The first actuator 156 and the second actuator 158 may be configured as pneumatic actuators, hydraulic actuators, electrical-mechanical actuators, or the like, and the present disclosure is not limited to any particular configuration of the first actuator 156 and the second actuator.

In some embodiments, each of the first thrust reverser door 134 and the second thrust reverser door 136 may include an actuator cavity 160. The actuator cavity 160 may be formed through the interior surface 146 of each of the thrust reverser doors 134, 136. The first actuator 156 may be pivotably mounted to the first thrust reverser door 134 within the actuator cavity 160 of the first thrust reverser door 134. Similarly, the second actuator 158 may be pivotably mounted to the second thrust reverser door 136 within the actuator cavity 160 of the second thrust reverser door 136. With the thrust reverser doors 134, 136 in the stowed position, a majority of the first actuator 156 and the second actuator 158 may be positioned within the actuator cavity 160 of each respective thrust reverser door 134, 136. The actuator cavity 160 of the first thrust reverser door 134 may be positioned between the first pivot axis 148 and the first axial end 138 of the first thrust reverser door 134. Similarly, the actuator cavity 160 of the second thrust reverser door 136 may be positioned between the second pivot axis 150 and the first axial end 138 of the second thrust reverser door 136. In some embodiments, the actuator cavity 160 may formed through the interior surface 146, the upper end 142, and the first axial end 138 of the respective thrust reverser door 134, 136. The present disclosure, however, is not limited to the configuration of the actuator cavity 160 illustrated in FIG. 9. For example, the actuator cavity 160 may alternatively be formed through the interior surface 146, the lower end 144, and the first axial end 138 of the respective thrust reverser door 134, 136.

With the thrust reverser doors 134, 136 in the stowed position, the actuator cavity 160 for each of the thrust reverser doors 134, 136 may introduce an aerodynamic drag on the exhaust gases 152 exiting the nozzle 54. Accordingly, in some embodiments, each of the first thrust reverser door 134 and the second thrust reverser door 136 may include an actuator fairing 162 configured to cover at least a portion of the actuator cavity 160 with the respective thrust reverser door 134, 136 in the stowed position. The actuator fairing 162 includes a first axial end 164 and a second axial end 166 opposite the first axial end 164. The actuator fairing 162 includes an upper end 168 and a lower end 170 opposite the upper end 168. The actuator fairing 162 includes a flowpath surface 172 and a fairing surface 174 opposite the flowpath surface 172. Each of the flowpath surface 172 and the fairing surface 174 may extend between the first axial end 164, the second axial end 166, the upper end 168, and the lower end 170.

Figure 8:
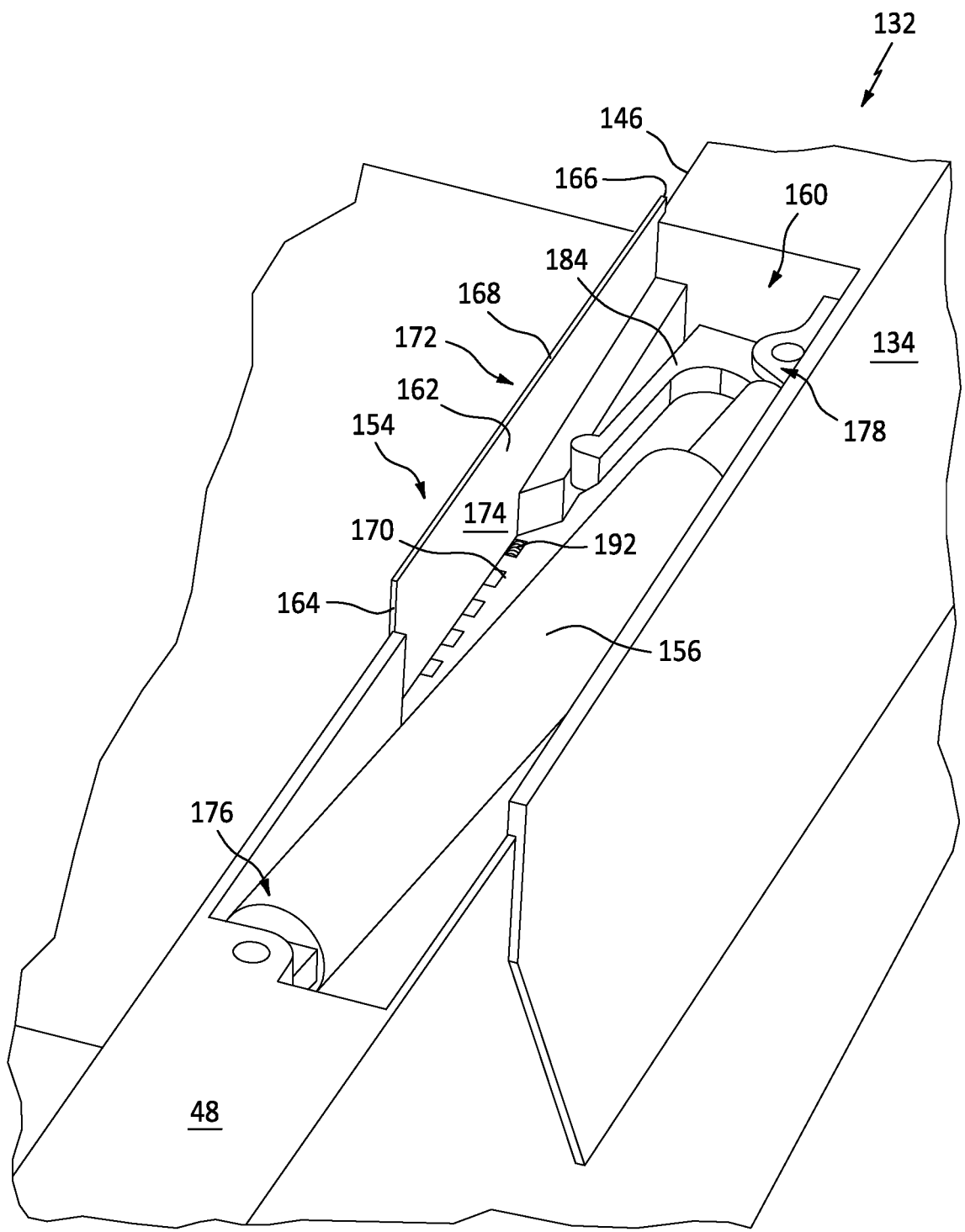
FIG. 8 illustrates a perspective view of a portion of a thrust reverser door, in accordance with one or more embodiments of the present disclosure.
Figure 9:
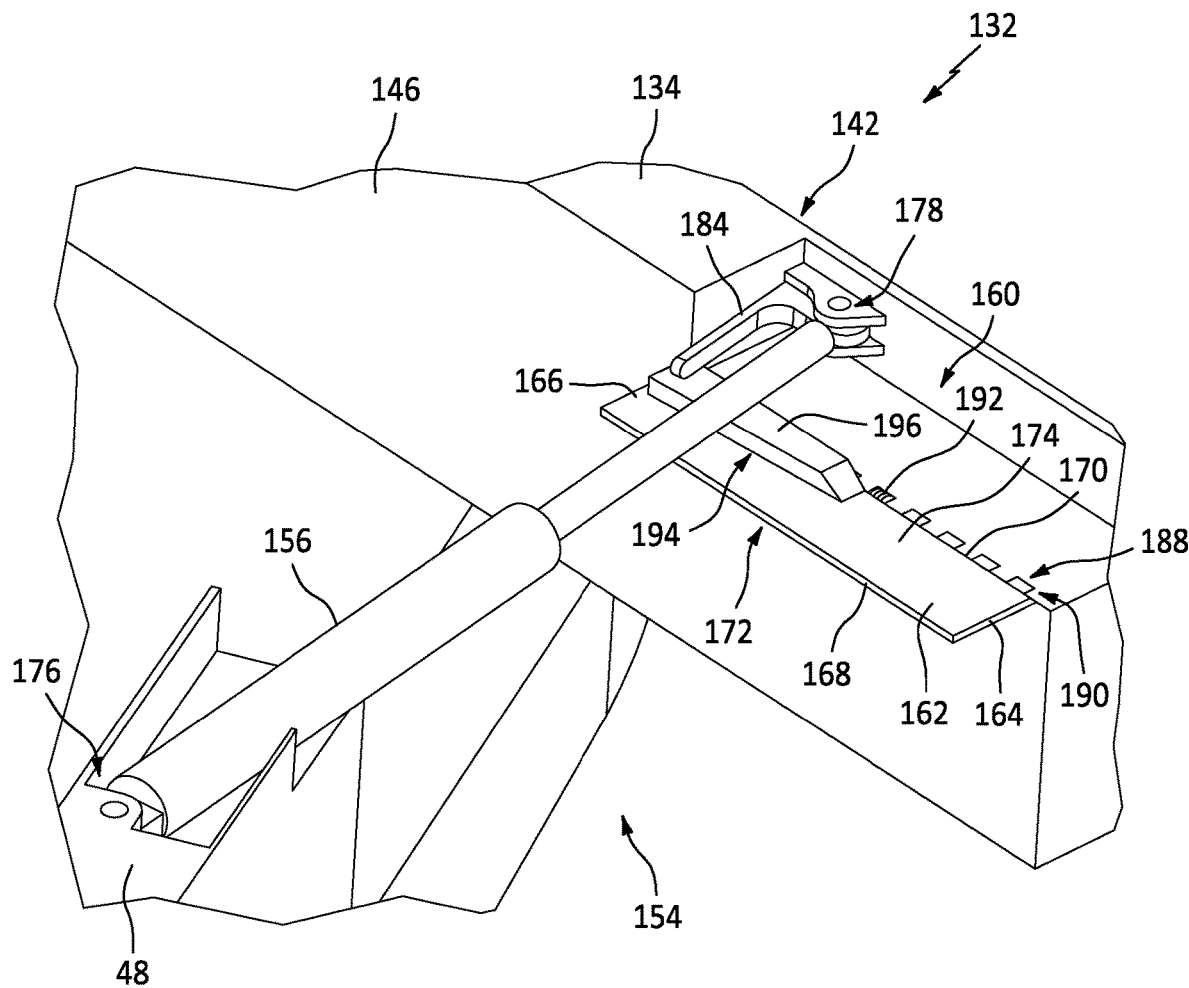
FIG. 9 illustrates a perspective view of a portion of a thrust reverser door, in accordance with one or more embodiments of the present disclosure.

The actuator fairing 162 of FIGS. 8 and 9 is hingedly mounted to the respective thrust reverser door 134, 136 by a hinge 188 having a hinge line 190 extending along all or a portion of the lower end 170 of the actuator fairing 162. In some other embodiments, the actuator fairing 162 may alternatively include a plurality of panels each hingedly mounted to the respective thrust reverser door 134, 136 by a respective hinge such as the hinge 188. The hinge 188 may be configured, for example, as a piano hinge, however, the present disclosure is not limited to any particular configuration of the hinge 188 and other configurations of hinges (e.g., gooseneck hinges) may alternatively be considered. The actuator fairing 162 may be pivotable about the hinge line 190 between a stowed position and a deployed position which may correspond to the stowed position and the deployed position of the respective thrust reverser doors 134, 136. In the stowed position of the actuator fairing 162, the flowpath surface 172 of the actuator fairing 162 may be substantially aligned with the interior surface 146 of the respective thrust reverser door 134, 136. In the deployed position of the actuator fairing 162, the actuator fairing 162 may extend outward from the respective thrust reverser door 134, 136 in a direction from the lower end 170 toward the upper end 168 of the actuator fairing 162. The hinge line 190 may be oriented substantially perpendicular to the pivot axis 148, 150 of the respective thrust reverser door 134, 136.

In the embodiments, the actuator fairing 162 may be biased in the stowed position. The actuator fairing 162 may include a biasing member 192 mounted to the actuator fairing 162 and the respective thrust reverser door 134, 136 and configured to bias the actuator fairing 162 in the stowed position. The biasing member 192 may include, for example, one or more springs. The location of the hinge line 190 along the lower end 170 of the actuator fairing 162 may require less biasing force to maintain the actuator fairing 162 in the stowed position in comparison to a hinge line along the second axial end 166, for example.

In some embodiments, the actuator fairing 162 may include a wear member 194 including a wear surface 196. The wear member 194 may project outward from the fairing surface 174 of the actuator fairing 162 to the wear surface 196 at a distal end of the wear member 194. The wear member 194 may be ramped such that a height of the wear surface 196 from the fairing surface 174 increases along the wear member 194. For example, the wear member 194 may have a height between the wear surface 196 and the fairing surface 174 which includes in a direction extending from the first axial end 164 to the second axial end 166 of the actuator fairing 162. As the first actuator 156 actuates to pivot the first thrust reverser door 134 from the stowed position to the deployed position, the first actuator arm 184 of the first actuator 156 may contact and slide along the wear surface 196 to overcome the biasing force of the biasing member 192 and pivot the actuator fairing 162 from the stowed position to the deployed position.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable area nozzle assembly for a gas turbine engine, the variable area nozzle assembly comprising: a fixed structure surrounding an exhaust duct extending along a nozzle centerline, the fixed structure defining an exhaust duct outlet of the exhaust duct, the fixed structure including an upper side and a lower side opposite the upper side, the fixed structure further including a first lateral side and a second lateral side opposite the first lateral side; a nozzle disposed about the nozzle centerline, the nozzle including a nozzle outlet including a nozzle outlet cross-sectional area; and a thrust reverser system including a first thrust reverser door and a second thrust reverser door, the first thrust reverser door pivotably mounted to the fixed structure at the first lateral side about a first pivot axis, the second thrust reverser door pivotably mounted to the fixed structure at the second lateral side about a second pivot axis, the first thrust reverser door and the second thrust reverser door defining a portion of the nozzle outlet of the nozzle, wherein each of the first thrust reverser door and the second thrust reverser door include: an inner flow path surface facing the nozzle centerline; and an actuator cavity formed through the inner flow path surface and the first axial end, wherein each of the first thrust reverser door and the second thrust reverser door include an actuator fairing pivotably mounted to a respective one of the first thrust reverser door and the second thrust reverser door, the actuator fairing pivotable between a stowed position and a deployed position, wherein the actuator fairing, in the stowed position, is configured to cover the actuator cavity.

2. The variable area nozzle assembly of claim 1, wherein the nozzle outlet cross-sectional area has a rectangular cross-sectional shape.

3. The variable area nozzle assembly of claim 1, wherein:
the nozzle includes an upper panel pivotably mounted to the fixed structure at the upper side and a lower panel pivotably mounted to the fixed structure at the lower side; and
each of the upper panel and the lower panel are pivotable between a first position defining a maximum area of the nozzle outlet cross-sectional area and a second position defining a minimum area of the nozzle outlet cross-sectional area.

4. The variable area nozzle assembly of claim 1, wherein each of the first thrust reverser door and the second thrust reverser door extend from a first axial end located axially forward of the nozzle outlet to a second axial end located axially aft of the nozzle outlet.

5. The variable area nozzle assembly of claim 4, wherein the first pivot axis is located axially between the first axial end and the second axial end of the first thrust reverser door and the second pivot axis is located axially between the first axial end and the second axial end of the second thrust reverser door.

6. The variable area nozzle of claim 4, wherein the second axial end of the first thrust reverser door moves toward the second axial end of the second thrust reverser door as the first thrust reverser door and the second thrust reverser door pivot from the stowed position to the deployed position.

7. The variable area nozzle of claim 1, wherein the thrust reverser system further includes a first actuator and a second actuator configured to pivot the first thrust reverser door and the second thrust reverser door, respectively, the first actuator mounted to the first thrust reverser door within the actuator cavity of the first thrust reverser door, the second actuator mounted to the second thrust reverser door within the actuator cavity of the second thrust reverser door.

8. The variable area nozzle of claim 1, wherein the thrust reverser system further includes a first actuator and a second actuator, the first actuator mounted to the first thrust reverser door within the actuator cavity of the first thrust reverser door, the second actuator mounted to the second thrust reverser door within the actuator cavity of the second thrust reverser door.

9. The variable area nozzle of claim 8, wherein each of the first actuator and the second actuator includes an actuator arm configured to contact the actuator fairing of the first thrust reverser door and the second thrust reverser door, respectively.

10. The variable area nozzle of claim 9, wherein the actuator fairing includes a wear member including a ramped wear surface.

11. The variable area nozzle of claim 10, wherein the actuator arm is configured to slide along the ramped wear surface as the actuator fairing pivots between the stowed position and the deployed position.

12. The variable area nozzle of claim 1, wherein the actuator fairing is biased to the stowed position of the actuator fairing.

13. A variable area nozzle assembly for a gas turbine engine, the variable area nozzle assembly comprising: a fixed structure surrounding an exhaust duct extending along a nozzle centerline, the fixed structure defining an exhaust duct outlet of the exhaust duct, the fixed structure including an upper side and a lower side opposite the upper side, the fixed structure further including a first lateral side and a second lateral side opposite the first lateral side; a nozzle disposed about the nozzle centerline, the nozzle including a nozzle outlet including a nozzle outlet cross-sectional area, the nozzle further including an upper panel pivotably mounted to the fixed structure and a lower panel pivotably mounted to the fixed structure, each of the upper panel and the lower panel pivotable between a first position defining a maximum area of the nozzle outlet cross-sectional area and a second position defining a minimum area of the nozzle outlet cross-sectional area; and a thrust reverser system including a first thrust reverser door and a second thrust reverser door, the first thrust reverser door pivotably mounted to the fixed structure at the first lateral side about a first pivot axis, the second thrust reverser door pivotably mounted to the fixed structure at the second lateral side about a second pivot axis, wherein each of the first thrust reverser door and the second thrust reverser door include: an inner flow path surface facing the nozzle centerline; and an actuator cavity formed through the inner flow path surface and the first axial end, wherein each of the first thrust reverser door and the second thrust reverser door include an actuator fairing pivotably mounted to a respective one of the first thrust reverser door and the second thrust reverser door, the actuator fairing pivotable between a stowed position and a deployed position, wherein the actuator fairing, in the stowed position, is configured to cover the actuator cavity.

* * * * *